(12) United States Patent
Dunham et al.

(10) Patent No.: US 12,302,794 B2
(45) Date of Patent: May 20, 2025

(54) RAKE WHEELS FOR GATHERING CROP MATERIAL

(71) Applicant: Vermeer Manufacturing Company, Pella, IA (US)

(72) Inventors: Lisle J. Dunham, Grinnell, IA (US); Ty Hartwick, Pella, IA (US); Xiaohang Wang, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 668 days.

(21) Appl. No.: 17/541,488

(22) Filed: Dec. 3, 2021

(65) Prior Publication Data

US 2022/0087108 A1 Mar. 24, 2022

Related U.S. Application Data

(63) Continuation of application No. 16/692,501, filed on Nov. 22, 2019, now Pat. No. 11,202,411, which is a continuation of application No. 15/279,128, filed on Sep. 28, 2016, now Pat. No. 10,499,568.

(60) Provisional application No. 62/236,601, filed on Oct. 2, 2015.

(51) Int. Cl.
*A01D 78/14* (2006.01)
*A01D 80/02* (2006.01)

(52) U.S. Cl.
CPC ............ *A01D 78/14* (2013.01); *A01D 80/02* (2013.01)

(58) Field of Classification Search
CPC ................................ A01D 78/14; A01D 80/02
See application file for complete search history.

(56) References Cited

U.S. PATENT DOCUMENTS

| | | | |
|---|---|---|---|
| 2,486,766 A | * | 11/1949 | Stenzel .................. A01D 78/14 56/14.8 |
| 2,687,965 A | | 8/1954 | Schiermeier |
| 2,712,723 A | | 7/1955 | Ryan et al. |
| 2,811,008 A | | 10/1957 | Plant et al. |
| 2,867,965 A | | 1/1959 | Goodall et al. |
| 2,909,888 A | | 10/1959 | Van Der Lely et al. |
| 2,925,700 A | | 2/1960 | Plant et al. |
| 3,038,292 A | | 6/1962 | Van Der Lely et al. |
| 3,057,144 A | | 10/1962 | Van Der Lely |
| 3,057,145 A | | 10/1962 | Van Der Lely |

(Continued)

FOREIGN PATENT DOCUMENTS

| CN | 2610630 Y | 4/2004 |
|---|---|---|
| CN | 203827742 U | 9/2014 |

(Continued)

OTHER PUBLICATIONS

International Seach Report, Application No. PCT/NL2011/000052, dated Jul. 23, 2013, 5 pages.

(Continued)

*Primary Examiner* — Alicia Torres
(74) *Attorney, Agent, or Firm* — Armstrong Teasdale LLP

(57) ABSTRACT

Rake wheels for raking apparatus for gathering crop material into a windrow. The rake wheel includes a center hub and disks for securing and limiting circumferential and axial movement of the tines of the rake wheel. The rake wheel may include a set of fasteners for securing the tines to the disk with the set of fasteners being disposed radially outward of the center hub.

19 Claims, 19 Drawing Sheets

(56) References Cited

U.S. PATENT DOCUMENTS

| | | | |
|---|---|---|---|
| 3,083,521 | A | 4/1963 | Cunningham |
| 3,401,753 | A | 9/1968 | Bezzerides et al. |
| 3,447,295 | A | 6/1969 | Van Der Ley |
| 3,597,910 | A | 8/1971 | Stewart |
| 3,834,140 | A | 9/1974 | Delfino |
| 3,910,020 | A | 10/1975 | Spindler |
| 4,015,411 | A | 4/1977 | Van Der Lely et al. |
| 4,114,697 | A | 9/1978 | Carlucci |
| 4,133,390 | A | 1/1979 | Reaume |
| 4,324,093 | A | 4/1982 | Van Der Lely et al. |
| 4,574,890 | A | 3/1986 | Hansen et al. |
| 4,667,461 | A | 5/1987 | Forbes |
| 4,871,031 | A | 10/1989 | Kestel |
| 5,199,252 | A | 4/1993 | Peeters |
| 5,396,756 | A | 3/1995 | Franklin |
| 5,546,739 | A | 8/1996 | Hettich |
| 5,974,771 | A | 11/1999 | Grennan |
| 6,220,008 | B1 | 4/2001 | Rowse et al. |
| 6,314,710 | B1 | 11/2001 | Tonutti |
| 6,543,212 | B2 | 4/2003 | Tonutti |
| 6,715,275 | B1 | 4/2004 | Kuehn |
| 6,978,592 | B1 | 12/2005 | Miller |
| 7,328,567 | B2 | 2/2008 | Kappel et al. |
| 7,350,347 | B2 | 4/2008 | Staheli |
| 7,360,353 | B2 | 4/2008 | Hruska et al. |
| 7,540,139 | B2 | 6/2009 | Rowse et al. |
| 8,291,562 | B2 | 10/2012 | Webb |
| 8,322,124 | B2 | 12/2012 | Munk |
| 8,997,447 | B2 | 4/2015 | Yaske et al. |
| 9,288,943 | B2 | 3/2016 | Bentzinger |
| 2005/0072134 | A1 | 4/2005 | Cook |
| 2011/0219740 | A1 | 9/2011 | Abughazaleh |
| 2012/0036820 | A1 | 2/2012 | Munk |
| 2013/0104514 | A1 | 5/2013 | Bentzinger |

FOREIGN PATENT DOCUMENTS

| | | | |
|---|---|---|---|
| DE | 1457983 | A1 * | 4/1969 |
| DE | 3418352 | A1 | 1/1986 |
| DE | 3914482 | C | 11/1986 |
| DE | 3529130 | A1 | 3/1987 |
| DE | 102011113121 | A1 | 12/2012 |
| FR | 1026740 | A | 4/1953 |
| FR | 1176205 | A | 4/1959 |
| FR | 1282197 | A | 1/1962 |
| GB | 786230 | A | 11/1957 |
| GB | 790916 | A | 2/1958 |
| GB | 800022 | A | 8/1958 |
| GB | 306005 | A | 12/1958 |
| GB | 805469 | A | 12/1958 |
| GB | 859340 | A | 1/1961 |
| GB | 941890 | A | 4/1961 |
| GB | 878169 | A | 9/1961 |
| GB | 1114279 | A | 5/1968 |
| GB | 1120680 | A | 7/1968 |
| GB | 1128365 | A | 9/1968 |
| GB | 2100567 | A | 1/1983 |

OTHER PUBLICATIONS

Wikipedia-UHMW PE, Wimipedia, "Ultra high molecular weight polythylene", May 4, 2008, 1 page.

Wikipedia-Nylon, Wikipedia "Nylon", Dec. 3, 2003, 1 page.

H&S X-Series Rake, Commercial WindBoard, http://www.beavervalleysupply.com/sectionc/hsxrake.htm, available before Oct. 2, 2015.

Bale King—VR Series Rake Wheel, http://bridgeviewmanufacturing.com/products-category/hay-rakes/, available before Oct. 2, 2015.

Multi Farming Systems Rock Rake, http://www.producer.com/2010/12/raking-rocks-the-aussie-way/, available before Oct. 2, 2015.

Tonutti, Millennium Pro V20, https://www.modhoster.com/mods/tonutti-milennium-v-20, available before Oct. 2, 2015.

Tonutti, Millennium Pro, http://www.tonutti.it/products.php?cat=8&prod_id=28, available before Oct. 2, 2015.

Tonutti, Millennium Pro V24, https://www.youtube.com/watch?v=ZXT4OkgZvLw, available before Oct. 2, 2015.

Tonutti, Millennium, https://www.fastline.com/v100/Tonutti-MILLENNIUM-EDNEY-DISTRIBUTING-CO,-INC-AKEVILLE-MN-equipment-detail-dc203a2a-a1af-4b32-b147-0277e9938b44.aspx, available before Oct. 2, 2015.

Case IH, WRX Series Rakes, http://www.caseih.com/apac/en-int/products/hay-forage/wheel-rakes, available before Oct. 2, 2015.

John Deere 567 Rake, https://usfarmer.com/john-deere-567-22498, available before Oct. 2, 2015.

International Search Report, International Patent Application No. PCT/US2016/054606, dated Jan. 9, 2017, pp. 1-15.

* cited by examiner

RAKE WHEELS FOR GATHERING CROP MATERIAL

CROSS-REFERENCE TO RELATED APPLICATION

This application is a Continuation of U.S. patent application Ser. No. 16/692,501, filed Nov. 22, 2019, which is a Continuation of U.S. patent application Ser. No. 15/279,128, filed Sep. 28, 2016, now U.S. Pat. No. 10,499,568, which claims the benefit of U.S. Provisional Application No. 62/236,601, filed Oct. 2, 2015. Each application is incorporated herein by reference in its entirety.

FIELD OF THE DISCLOSURE

The field of the disclosure relates to raking apparatus and, in particular, rake wheels for gathering crop material into a windrow. In some embodiments, each rake wheel includes support members (e.g., disks) for securing and limiting circumferential movement of the tines.

BACKGROUND

Wheel rakes are used to rake crop materials to gather the material into windrows for baling and to promote drying of the material. Wheel rakes are typically configured as a V-rake, which may include a main frame having two arms to which a set of rake wheels are attached. The rake arms may be positioned adjacent the main frame in a closed or traveling position or extended in the form of a "V" in the open or raking position. Each rake arm includes a number of suspension mechanisms, each supporting a single rake wheel, with four to ten or more rake wheels supported by each rake arm. The suspension mechanisms allow the rake wheels to change height to follow the terrain while maintaining a consistent weight of the rake wheel on the ground.

Each rake wheel includes a number of tines or "teeth" that contact the crop material during rotation of the rake wheel. Over time, the tines of the rake wheel wear, particularly at contact points with other components such as a tine support band or "wheel hoop". This wear creates stress risers and can cause the tine to fracture. Such fractures result in downtime to replace the tine and added expense for the owner.

A continuing need exists for rake wheels that are durable and which reduce wear and the rate of fracture of the tines.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a rake wheel for gathering crop material into a windrow. The rake wheel includes a center hub having a rotational axis about which the rake wheel rotates. A plurality of tines extend outward from the center hub. The tines define an outer circumference for engaging a surface over which the rake wheel rotates. The rake wheel includes a first support member for securing the tines and a second support member for securing the tines. The tines are clamped between the first and second support members.

Another aspect of the present disclosure is directed to a rake wheel for gathering crop material into a windrow. The rake wheel includes a center hub having a rotational axis about which the rake wheel rotates. A plurality of tines extend outward from the center hub. The tines define an outer circumference for engaging a surface over which the rake wheel rotates. The rake wheel includes a disk for securing the tines. The disk has an outer surface and an inner surface. The outer and inner surfaces extend radially toward the outer circumference. Each tine is secured to the inner surface to limit circumferential movement of the tines.

Yet a further aspect of the present disclosure is directed to a rake wheel for gathering crop material into a windrow. The rake wheel includes a center hub having a rotational axis about which the rake wheel rotates. A plurality of tines extend outward from the center hub. The tines define an outer circumference for engaging a surface over which the rake wheel rotates. The rake wheel include a disk having an outer surface and an inner surface. The inner surface contacts the tines. The outer and inner surfaces extend radially toward the central axis. The rake wheel does not include a support band.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
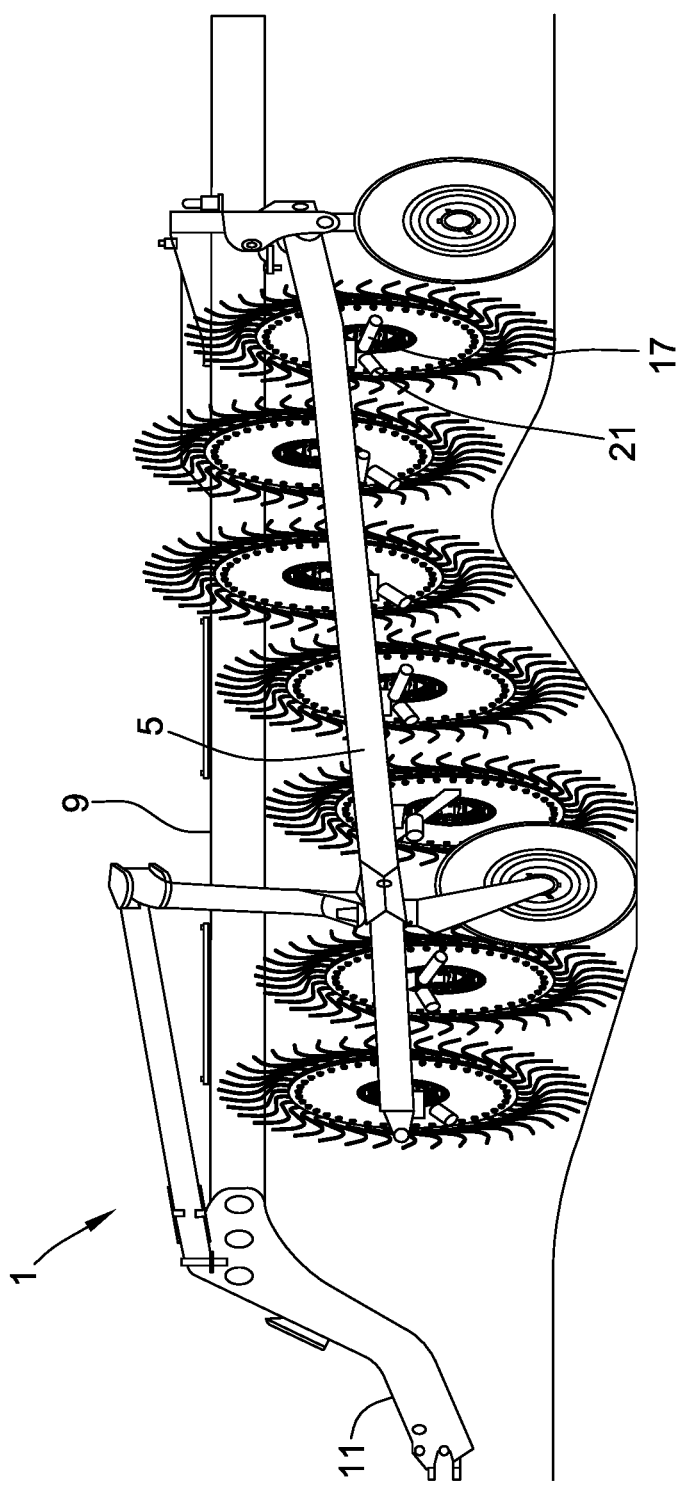
FIG. 1 is a side view of a raking apparatus having rakes wheel.

Referring now to FIG. 1, a portion of a raking apparatus 1 for gathering crop material into a windrow is shown. The raking apparatus 1 (which may also be referred to herein as a "wheel rake" or simply "rake") includes an arm 5 attached to a main frame 9 of the rake 1. The main frame 9 includes a tongue 11 for coupling the rake 1 to a pull vehicle (not shown) such as a tractor.

Figure 2:
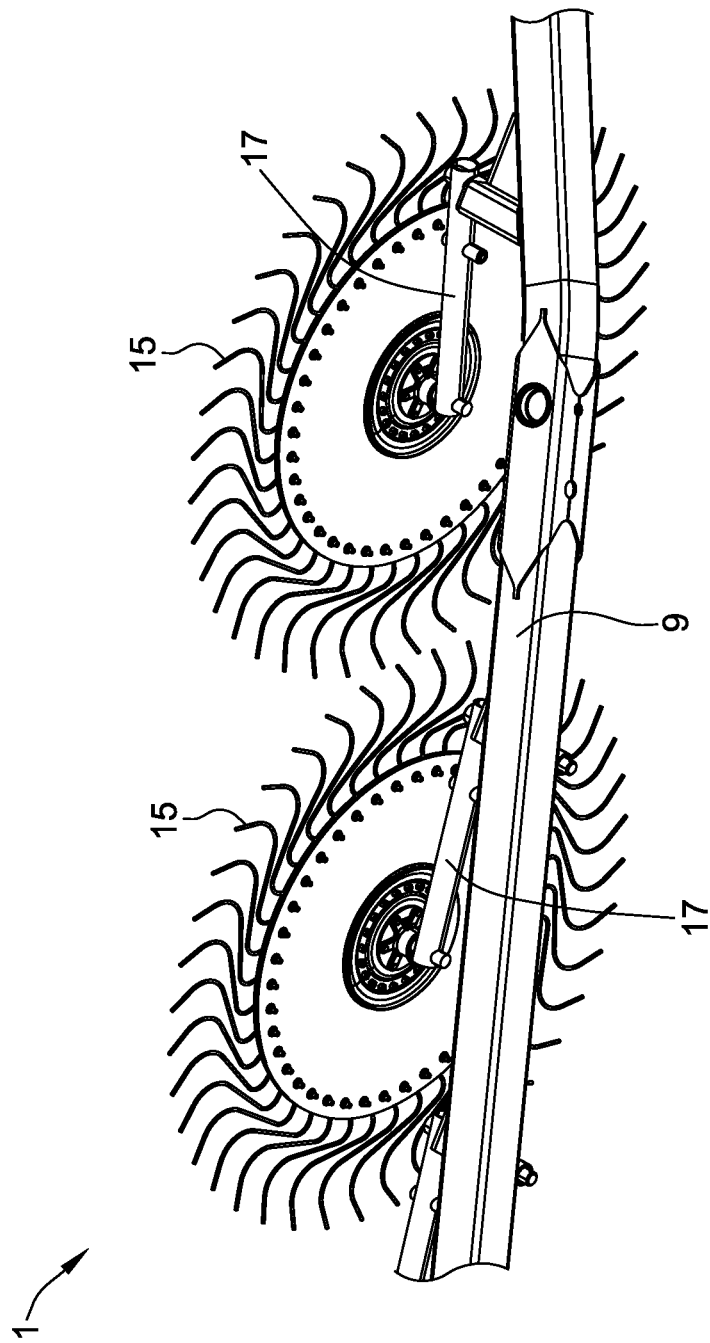
FIG. 2 is a partial perspective view of the rake wheel.

A plurality of rake wheels 15 are attached to each arm 5 by pivot members 17 (FIG. 2). A suspension element 21 (FIG. 1) such as a hydraulic cylinder or spring is also attached to the arm 5 and the pivot member 17. The suspension elements 21 allow the rake wheel 15 to independently "float" on the surface over which the rake 1 travels by responding to relative changes in the surface elevation (uneven terrain, obstacles such as rocks, crop piles etc.).

The raking apparatus 1 to which the rake wheel 15 is attached can be any implement in which crop or forage material is gathered into a windrow or in which a windrow is turned. Suitable apparatus include, for example, V-rakes, in-line wheel rakes and windrow turners. The rake wheel 15 may be a standard rake-wheel or may have specialized functions such as with center splitter wheels and windrow turner wheels.

Figure 3:
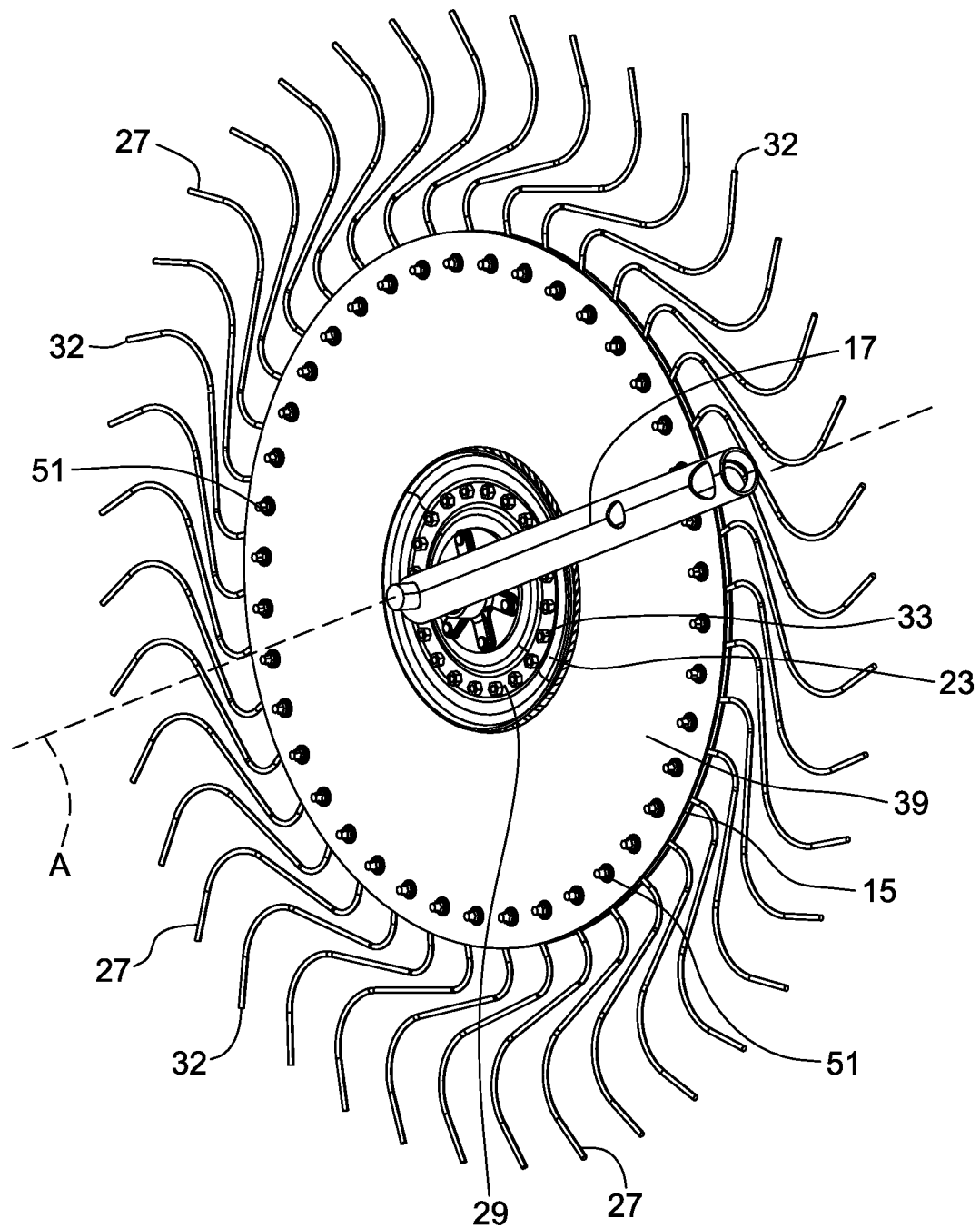
FIG. 3 is a perspective view of a rake wheel and pivoting member.

Each rake wheel 15 includes a center hub 23 (FIG. 3) and a rotational axis A through the center hub 23 about which the rake wheel 15 rotates. A hub assembly 25 (FIG. 4) is attached to the center hub 23. The hub assembly 25 includes a shaft and bearing that facilitates rotation of the rake wheel 15 around the shaft. The hub assembly 25 is shown for illustration and is not part of the rake wheel 15 unless stated otherwise.

Figure 4:
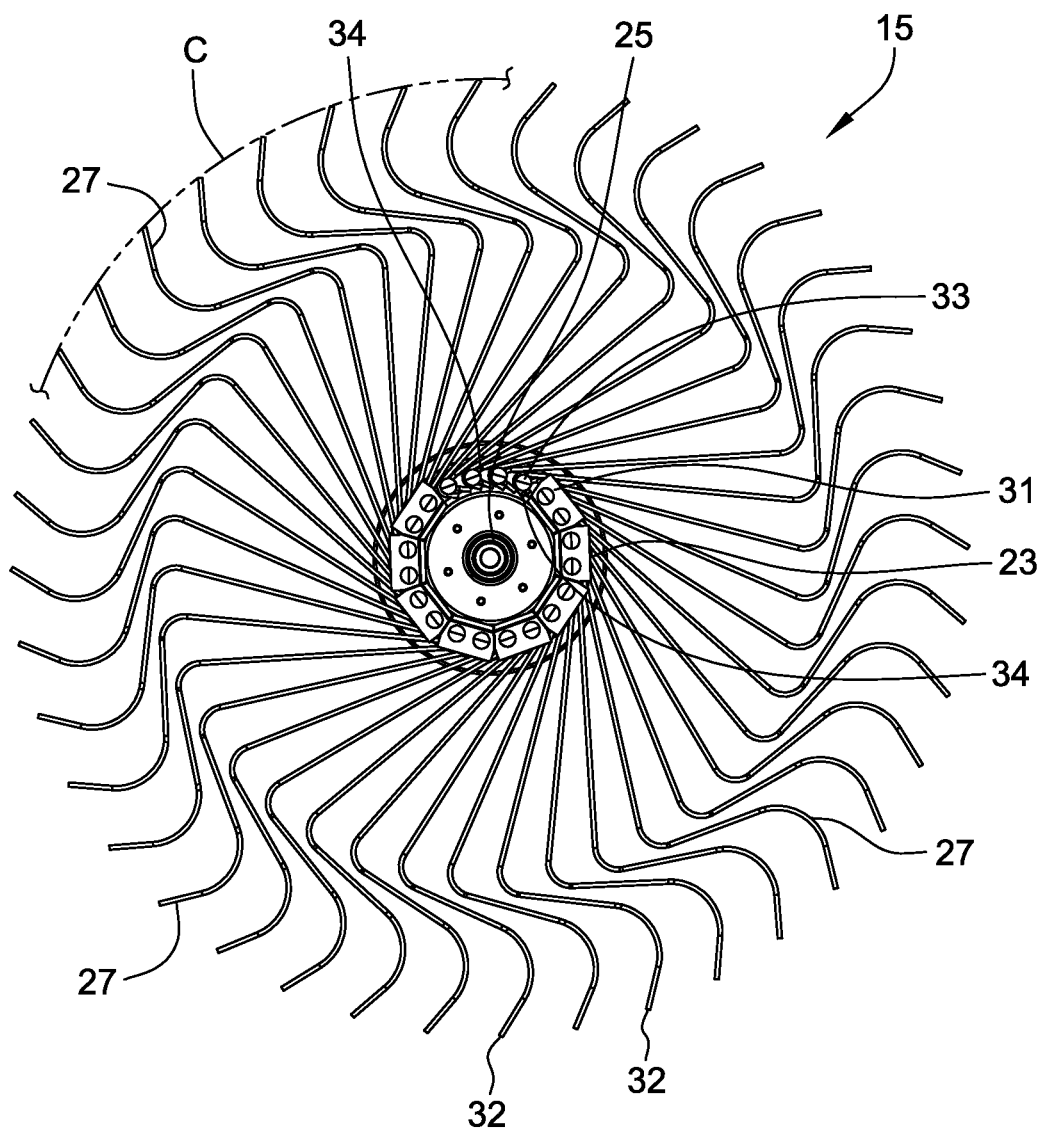
FIG. 4 is a side view of a rake wheel with first and second support members not being shown.

A plurality of tines 27 extend radially from the center hub 23 (e.g., directly outward or outward from the hub at an acute angle). The tines 27 may be secured to the center hub 23 by clamping the tines between a first plate 29 (FIG. 3) and a plurality of second plates 31 (FIG. 4). Plate fasteners 33 (e.g., nuts and bolts) are used to provide a clamping force between the first plate 29 and the second plates 31 to secure the tines 27 within the plates 29, 31.

In the illustrated embodiment, each tine 27 is a single tine having an outer end 32 (FIG. 4) and a hook-shaped inner end 34 for securing the tine 27 to the center hub 23. In other embodiments, each tine 27 is integrated with a second tine to form a "paired" tine, with each arm of the pair being a "tine" as referenced herein.

The tines 27 together define an outer circumference C (FIG. 4) at their outer ends 32 for engaging the surface over which the rake wheel 15 rotates. By contacting the ground as the rake 1 moves forward, the rake wheels 15 rotate and push crop material into a windrow for subsequent baling.

Figure 5:
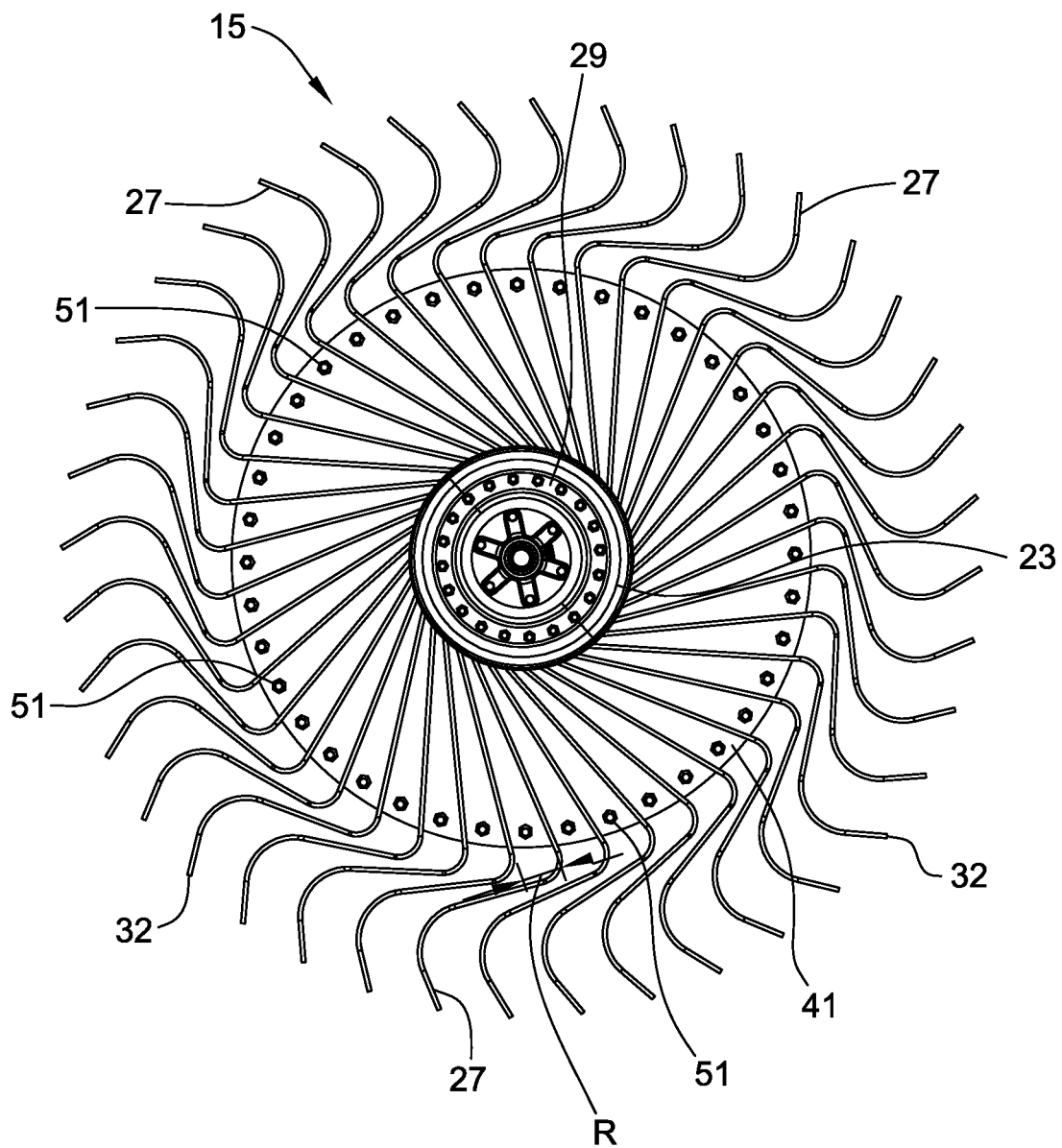
FIG. 5 is a side view of a rake wheel with the first support member not being shown.
Figure 8:
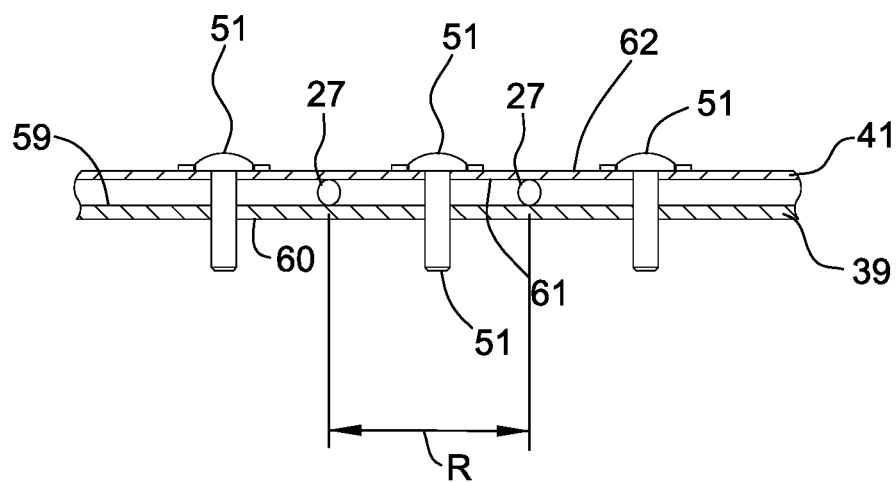
FIG. 8 is a cross-section view of the rake wheel taken along line 8-8 of FIG. 7.

The rake wheel 15 includes a first support member 39 (FIG. 3) and a second support member 41 (FIG. 5) for securing each tine 27. The support members 39, 41 are generally planar and extend radially from the center hub 23. In the illustrated embodiments, the first support member 39 (FIG. 3) and the second support member 41 (FIG. 5) are in the form, respectively, of first and second annular disks. While the support members 39, 41 in the illustrated embodiment are annular disks, in other embodiments the support members 39, 41 may have other shapes. For example, the support members 39, 41 may be segmented into different parts that act to clamp the tines 27 along the inner surfaces 59, 61 (FIG. 8) of the support members 39, 41. Further, while the rake wheel 15 is shown as having two support members 39, 41, in other embodiments the rake wheel includes a single support member that acts to clamp the tines 27.

Figure 6:
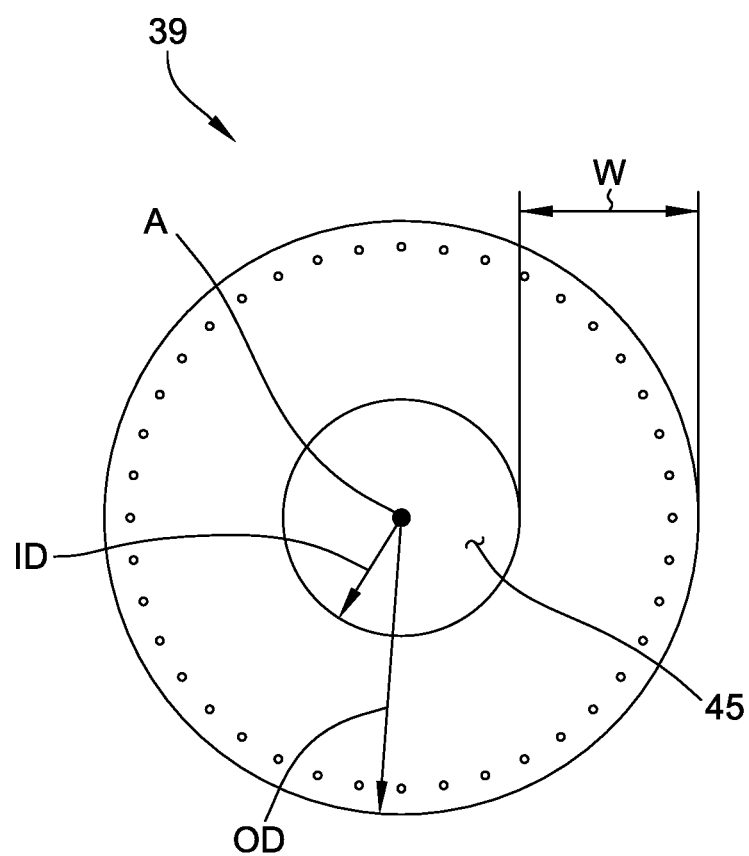
FIG. 6 is a side view of a support member.
Figure 7:
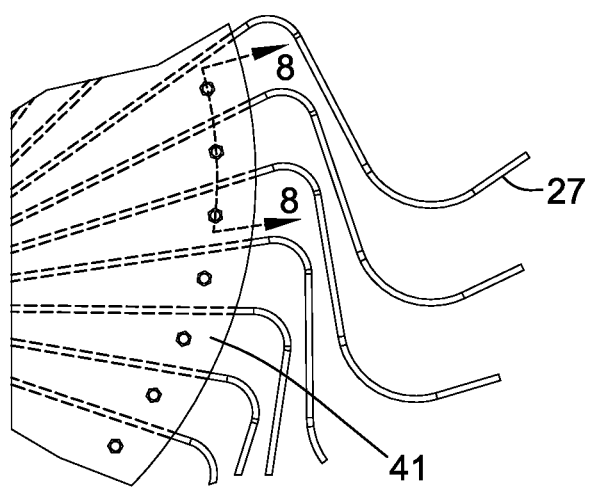
FIG. 7 is a partial side view of the rake wheel.

The disks 39, 41 have a center opening 45 (FIG. 6). Each disk 39, 41 has a width W that extends from the inner diameter ID of the opening 45 to an outer diameter OD. The illustrated disks 39, 41 are exemplary and may have shorter or longer inner diameters ID and/or outer diameters OD. The disks 39, 41 should be sufficiently wide to provide rigidity and structure to the disks 39, 41. In other embodiments, the second disk 41 does not include a center opening 45 and covers the rake wheel 15 from the rotational axis A (FIG. 3) toward its outer circumference C (FIG. 4).

The first disk 39 includes a first disk inner surface 59 (FIG. 8) and a first disk outer surface 60 that extend toward the outer circumference C (FIG. 4) of the rake wheel 15. The second disk 41 similarly includes a second disk inner surface 61 and a second disk outer surface 62 that extend toward the outer circumference C (FIG. 4) of the rake wheel 15. The tines 27 contact the inner surfaces 59, 61 of the first and second disks 39, 41. Tine fasteners 51 extend through and are connected to the disks 39, 41 to exert a clamping force to cause the inner surfaces 59, 61 to clamp and exert a holding force on the tines 27.

By securing the inner surfaces 59, 61 to each tine by use of tine fasteners 51, the circumferential movement of each tine relative to the disks 39, 41 is at least partially limited (i.e., the tines 27 do not move or their movement is constrained by the disks 39, 41). While the tines 27 have been described herein as being "secured", "biased" or "clamped" between the support members 39, 41, it should be understood that in some embodiments the tines 27 are permitted to move an amount circumferentially between the support members 39, 41 during use. The terms "secured", "biased" or "clamped" as used herein indicate that the support members 39, 41 at least partially limit circumferential movement of the tines 27 and should not be implied to refer to full limitation of circumferential movement unless stated otherwise (i.e., movement of the tines 27 is restricted by the support members 39, 41 but the tines may move within support members depending on the degree of force applied to the tines). The support members 39, 41 may also limit the displacement of the tines 27 in the axial direction relative to the rotational axis A, thereby providing lateral support during operation.

Suitable tine fasteners 51 include any component that fastens, secures or clamps the tines 27 to the support disk (or both disks 39, 41 in embodiments in which two disks are used) and may include, for example, nuts and bolts, clips, straps, rivets, welds (e.g., poly sonic welds), brackets, cables or other suitable retainers.

In some embodiments, only the support members 39, 41 act to limit circumferential movement of the tines 27 at their outer end 32 (i.e., nothing outside of the center hub 23 acts to limit circumferential movement of the tines 27 other than the support members 39, 41). In such embodiments, the rake wheels 15 do not include a support band (commonly referenced as a "hoop") having apertures therein through which the tines extend for securing the tines and limiting their circumferential and lateral (i.e., axial) movement.

Each tine fastener 51 extends between the first support member 39 and the second member 41 in an interspatial region R (FIG. 8) formed between adjacent tines 27. The tine fasteners 51 extend through the support members 39 and 41 near the outer diameter OD (FIG. 6) of the support members (i.e., closer to the outer diameter OD than the inner diameter ID of the support members 39, 41).

In some embodiments, spacers (not shown) are positioned between adjacent tines 27 and extend between the first support member 39 and the second support member 41.

Figure 9:
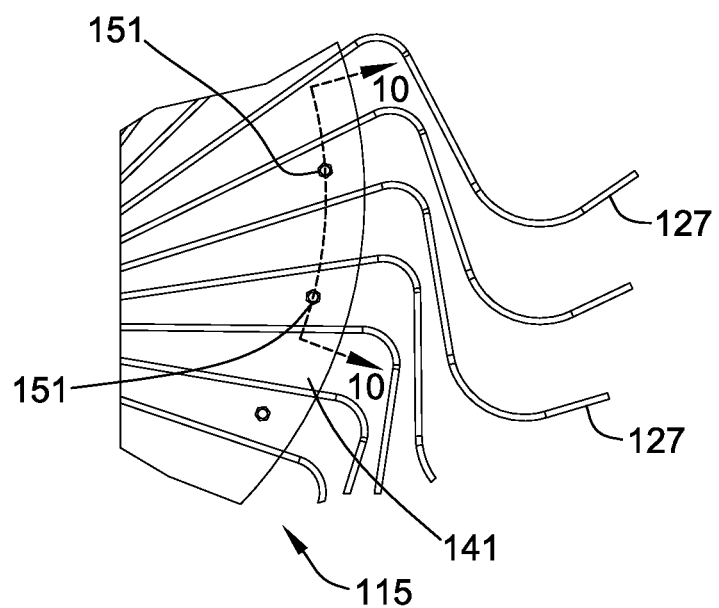
FIG. 9 is a partial cross-section view of another embodiment of the rake wheel.
Figure 10:
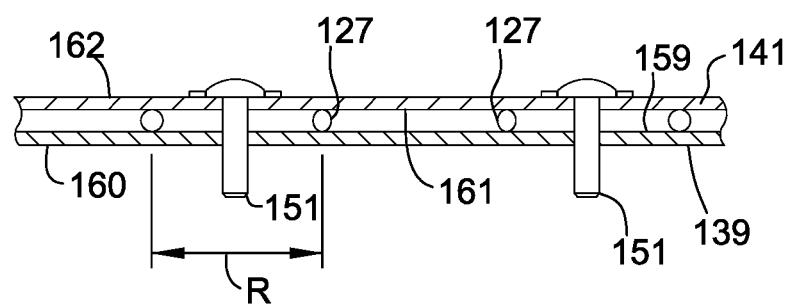
FIG. 10 is a cross-section view of the rake wheel taken along line 10-10 of FIG. 9.
Figure 11:
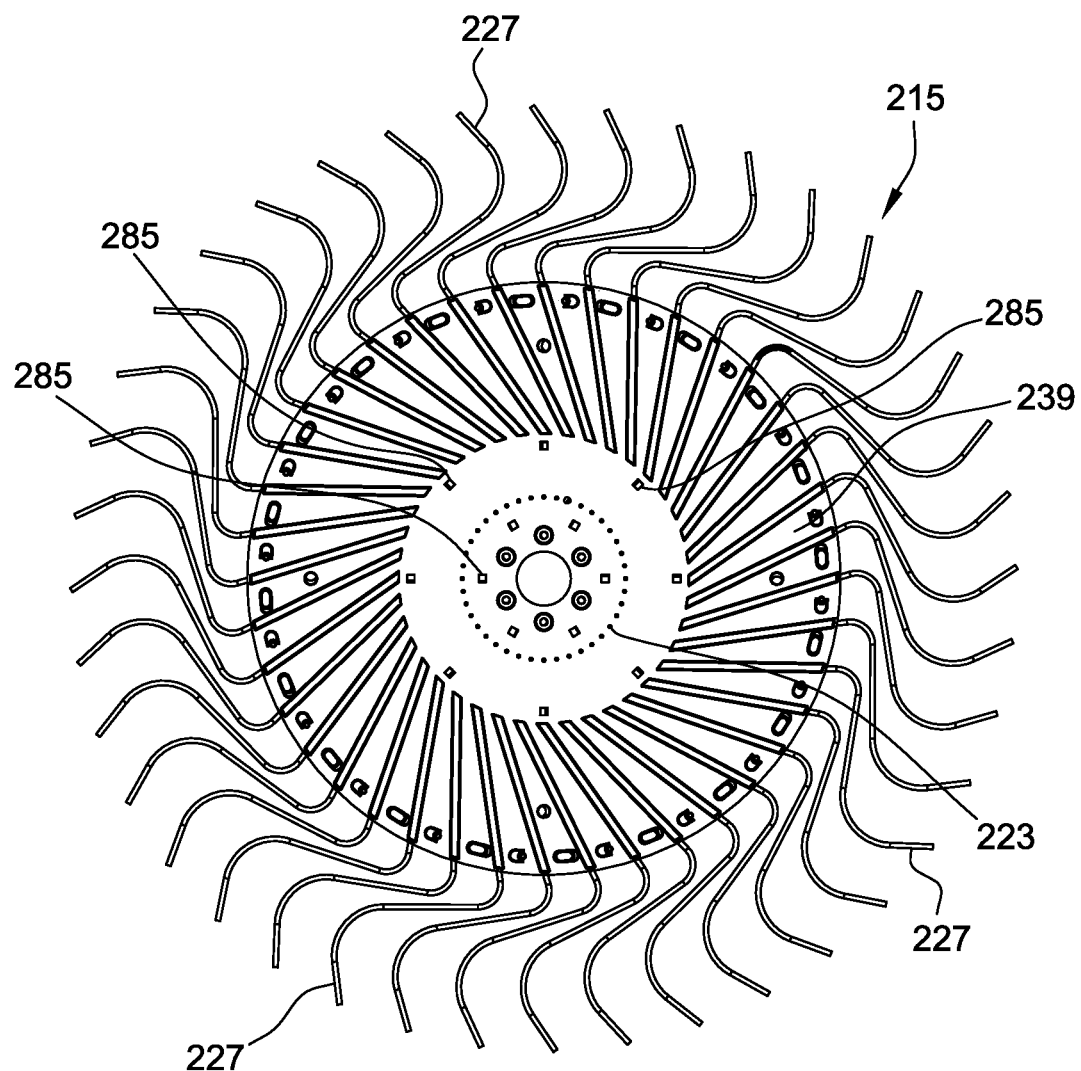
FIG. 11 is a side view of another embodiment of a rake wheel with the first support member being shown.
Figure 12:
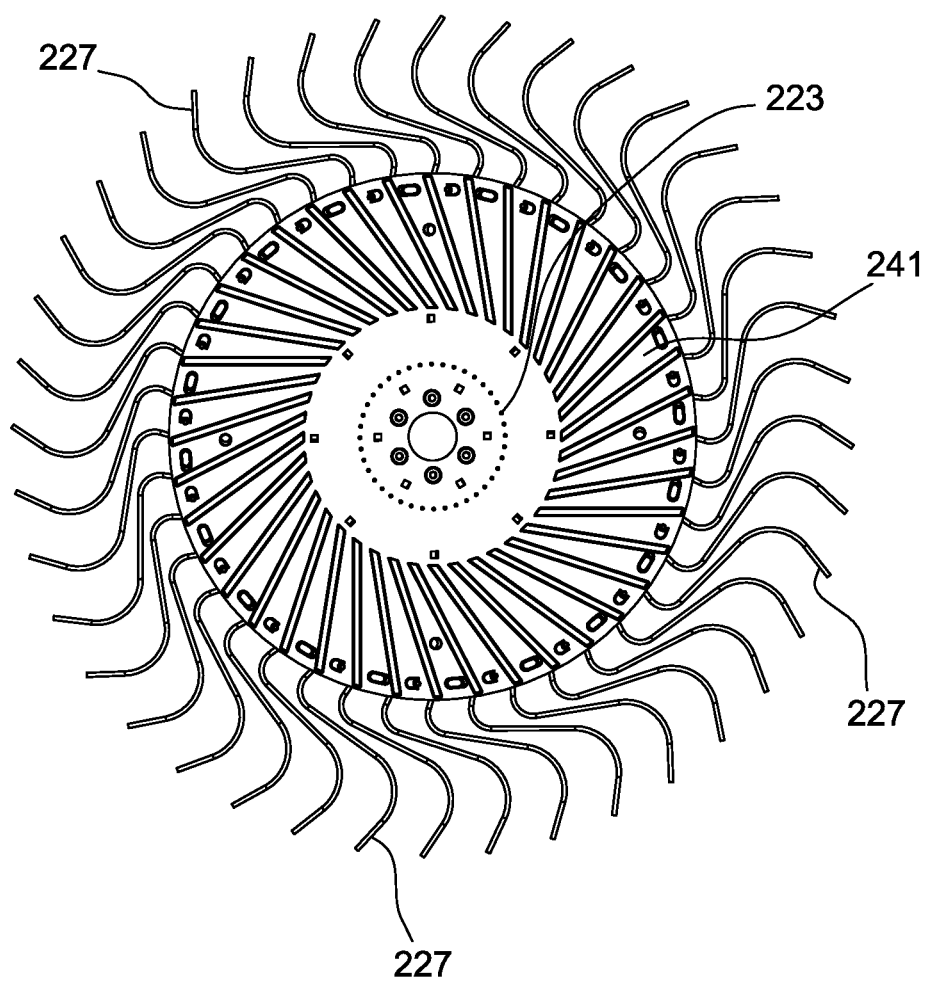
FIG. 12 is a side view of the rake wheel of FIG. 11 with a second support member being shown.

As illustrated in FIGS. 1-8, the rake wheels 15 include a tine fastener 51 for every tine 27. Another embodiment of the rake wheel is shown in FIGS. 9-10. The components shown in FIGS. 9-10 that are analogous to those of FIGS. 1-8 are designated by the corresponding reference number of FIGS. 1-8 plus "100" (e.g., part 10 becomes 110). In the embodiment shown in FIGS. 9-10, the rake wheel 115 includes one tine fastener 151 for every two tines 127. Other amounts and types of tine fasteners 151 may be used with the number of tine fasteners being sufficient to at least partially limit the circumferential movement of each tine 127.

In the illustrated embodiments, the tine fasteners 51 do not contact the tines 27 while the rake wheel 15 is in a resting position. The first and second support members 41 generally provide sufficient clamping force to prevent the tines 27 from contacting the fasteners 51 while the tines twist and move during use.

In other embodiments, the tine fasteners 51 may directly contact the tines 27, either incidentally during use or in as direct fastening arrangement. In such embodiments, the portion of the tine fastener 51 that contacts the tine 27 may be made of a material that does not cause substantial wear of the tine 27 (e.g., a polymer material).

The support members 39, 41 may be made of any suitable material that provides rigidity to the rake wheel 15 such that circumferential movement of the tines 27 is at least partially limited during use of the rake 1. Suitable materials include polymers (e.g., polyurethane, nylon and polyethylene), steel, aluminum or other metals. The support members 39, 41 may be laminated and include various functional layers (e.g., a rigid steel layer and a polymer gasket that contacts the tines). The tine fasteners 51 may be made of the same material as the tines 27 (e.g., steel) or a different material than the tines 27 (e.g., the tines being made of steel and the fasteners 51 being made of a polymer).

Another embodiment of a rake wheel 215 is shown in FIGS. 11-15. The components shown in FIGS. 11-15 that are analogous to those of FIGS. 1-8 are designated by the corresponding reference number of FIGS. 1-8 plus "200" (e.g., part 10 becomes 210). The rake wheel 215 includes a first support member 239 and a second support member 241 (FIG. 12) with tines 227 being clamped between the first and second support members 239, 241. The first and second support members 239, 241 are in the form, respectively, of first and second disks.

In the illustrated embodiment, the support members 239, 241 together form the center hub 223 to which the tines 227 are attached (i.e., the center hub 223 is integral with the support members 239, 241). In other embodiments, the center hub 223 may be separate from the support members 239, 241.

Figure 13:
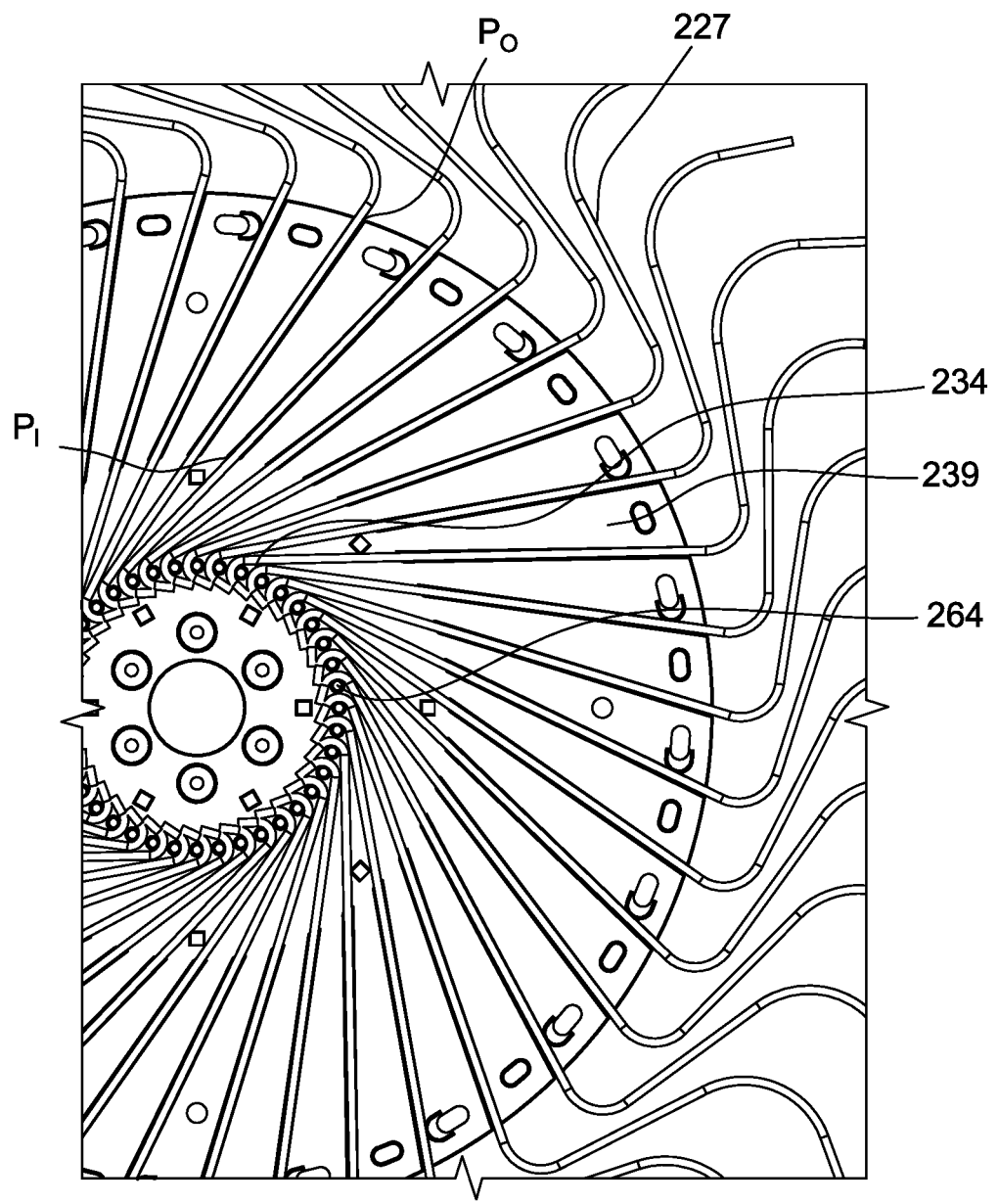
FIG. 13 is a detailed partial side view of the rake wheel of FIG. 11 with the second support member not being shown.

The center hub 223 has pins 264 (FIG. 13) about which the hook-shaped inner end 234 of the tines 227 are looped. The pins 264 may be connected to the first support member 239 as shown in FIG. 13 or the second support member. The second support member 241 may have corresponding pins (not shown) that extend outward to contact the pins 264 of the first support member 239. In other embodiments, the pins of the second support member 241 mate with the pins 264 of the first support member 239 in a male-female relationship.

Figure 14:
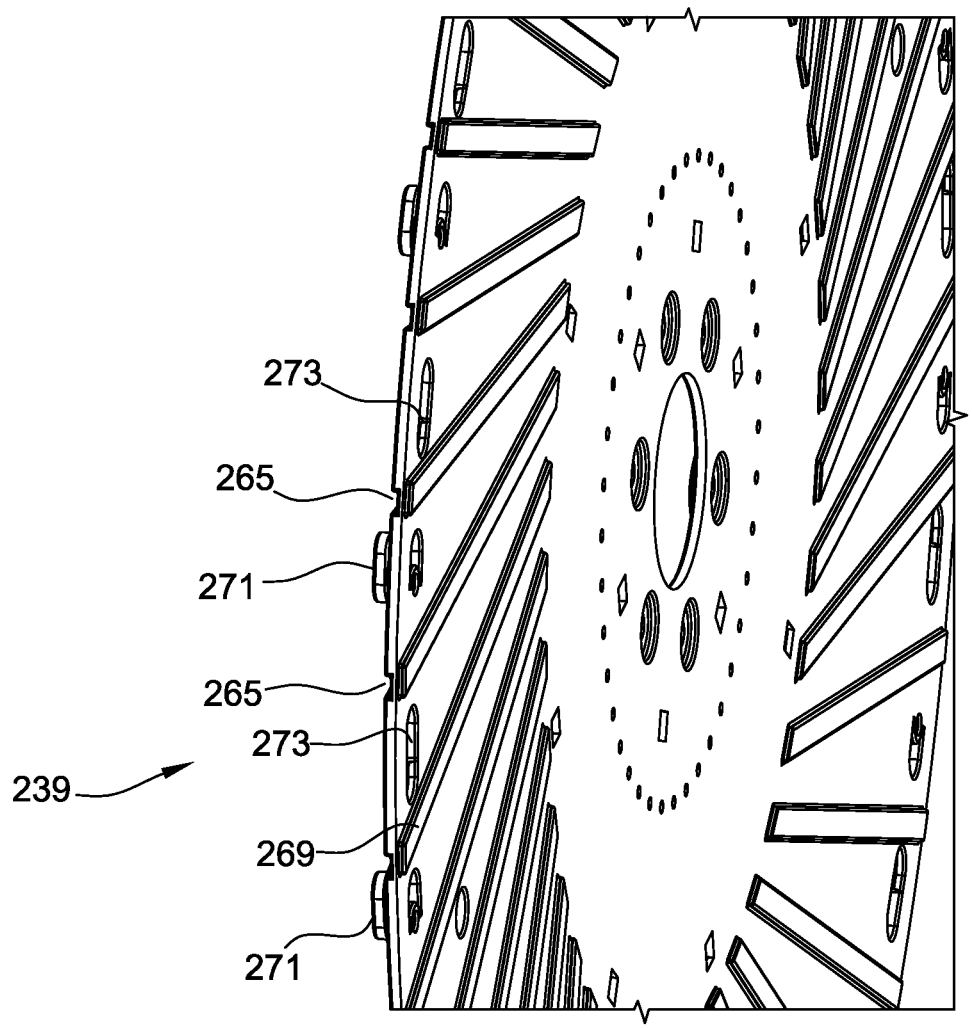
FIG. 14 is a detailed partial perspective view of the first support member of the rake wheel of FIG. 11.

The first support disk 239 includes grooves 265 (FIG. 14). Tines 227 (FIG. 11) are received in each groove 265 to limit circumferential movement of the tines 227. The groves 265 extend from an inward radial position, $P_I$, (FIG. 13) along the first support disk 239 to an outer radial position, $P_o$. As shown, the outer radial position, $P_o$, of the grooves corresponds to the outer circumference of the support disk 239. It should be noted that grooves 265 may extend between other radial positons (e.g., further toward the center of the disk 239 and/or spaced from the circumferential edge) as in other embodiments of the present disclosure. The first support disk 239 also includes ribs 269 on the surface opposite the grooves 265 to provide rigidity to the support member 239 and to provide a consistent wall thickness.

Figure 15:
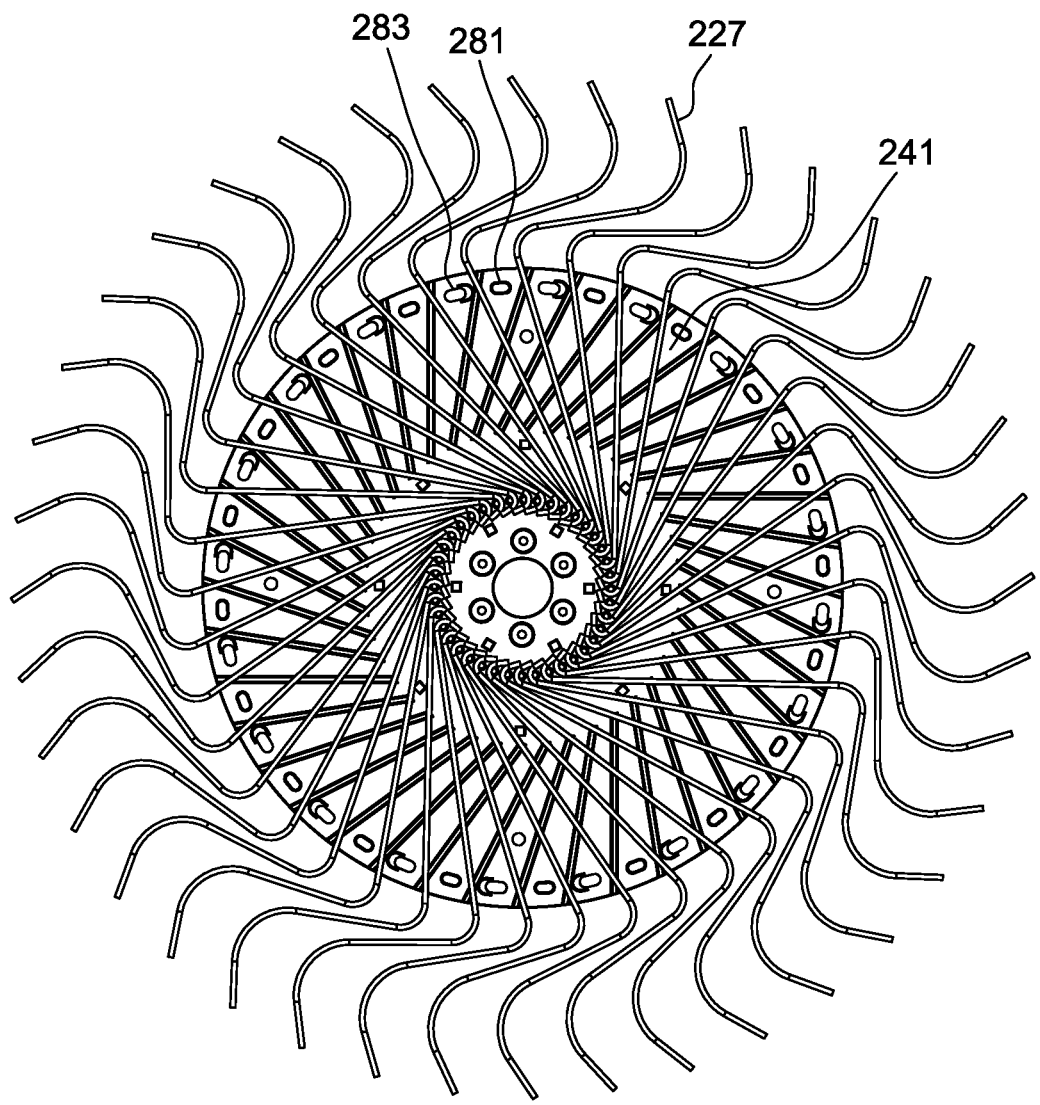
FIG. 15 is a side view of the rake wheel of FIG. 11 with the first support member not shown.

With reference to FIG. 15, the second support disk 241 also includes grooves and ribs. The tines 227 do not extend within the grooves of the second support disk 241 but rather extend across the grooves. The grooves of the second support disk 241 allow the second support disk 241 and first support disk 239 to be identical parts. In other embodiments, the grooves of the second support disk are arranged to receive the tines 227 within the grooves (i.e., both the first and second disks have corresponding grooves that form channels to receive the tines). In some embodiments, the grooves and/or ribs of the second support disk 241 are eliminated.

As shown in FIG. 14, the first support disk 239 includes first support disk pegs 271 and first support disk slots 273 that extend around the circumference of the disk 239. The pegs 271 and slots 273 alternate around the circumference. The second support disk 241 includes second support disk pegs 281 and second support disk slots 283 (FIG. 15). Each first support disk peg 271 mates with a corresponding second support disk slot 283 and each first support disk slot 273 mates with a second support disk peg 281. The first and second support members 239, 241 may be indexed such that the disk is rotated an amount during assembly to allow the disk pegs 271 to fully engage the disk slots 273.

The grooves 265 (FIG. 14) of the first support member 239 act to limit the circumferential and axial movement of the tines 227. The pegs 271, 281 also may limit the circumferential movement of the tines, such as when the tine contacts an obstruction causing the tine to be dislodged from the groove.

The first and second support members 239, 241 of FIGS. 11-15 may be made of any material that provides suitable rigidity as described above for the support members shown FIGS. 1-10. In some embodiments, the first and second support members 239, 241 are made of a polymer such as a molded polymer (e.g., HDPE, nylon or polyurethane).

The first and second support members 239, 241 include openings 285 (FIG. 11) through which support member fasteners (such as bolts and nuts, not shown) extend. In some embodiments, support members fasteners are eliminated and the first and second support members 239, 241 are secured to each other by the friction fit between the pegs 271, 281 and slots 273, 283 toward the outer circumference of the support members 239, 241 and/or the pins 264 at the center hub 223.

Figure 16:
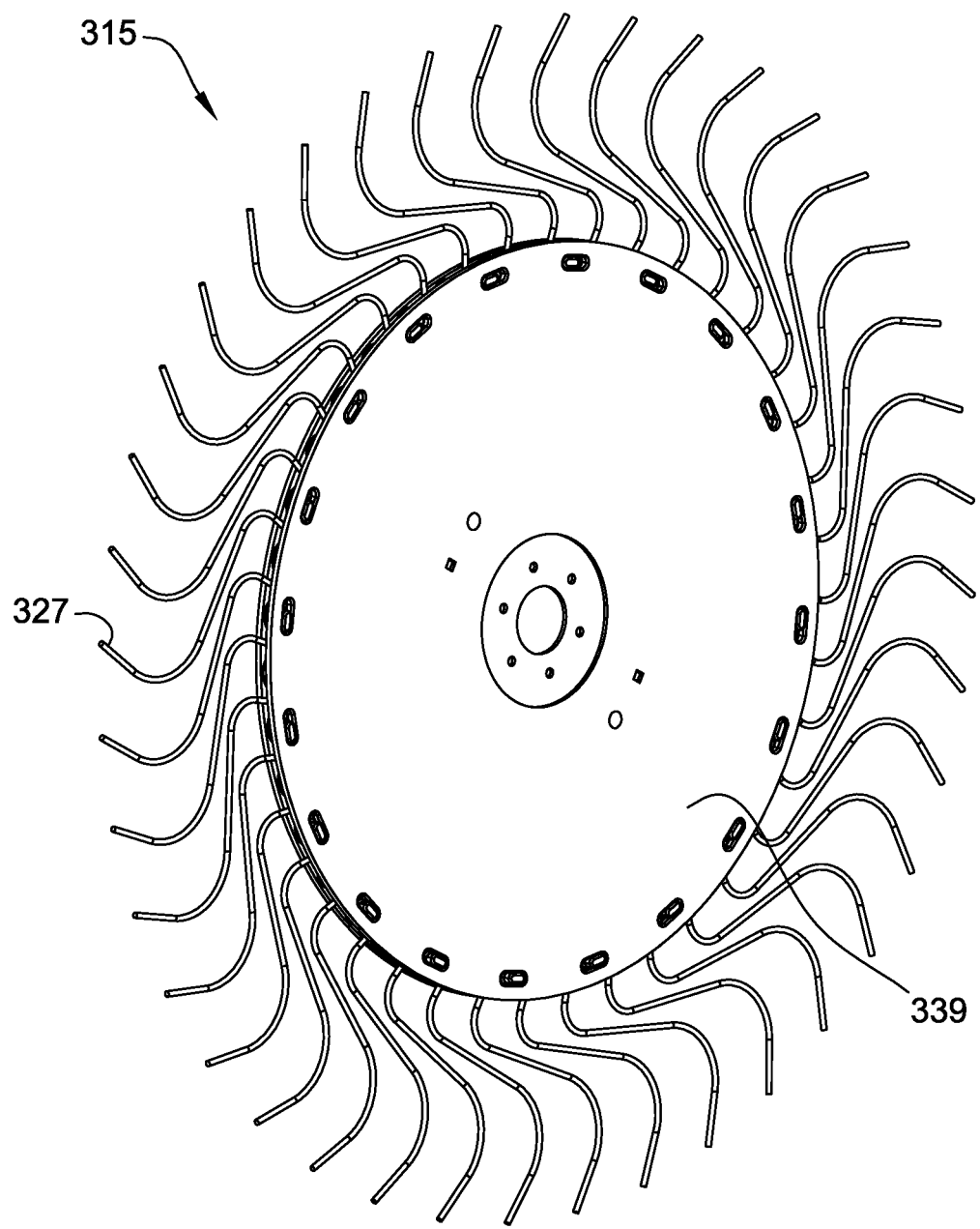
FIG. 16 is a perspective view of another embodiment of the rake wheel with the first support member being shown.

Another embodiment of the rake wheel 315 is shown in FIG. 16. The rake wheel 315 includes grooves (not shown) and is similar to rake wheel 215 of FIGS. 11-15; however, the rake wheel 315 does not include ribs at the outer surfaces of the support members.

Figure 17:
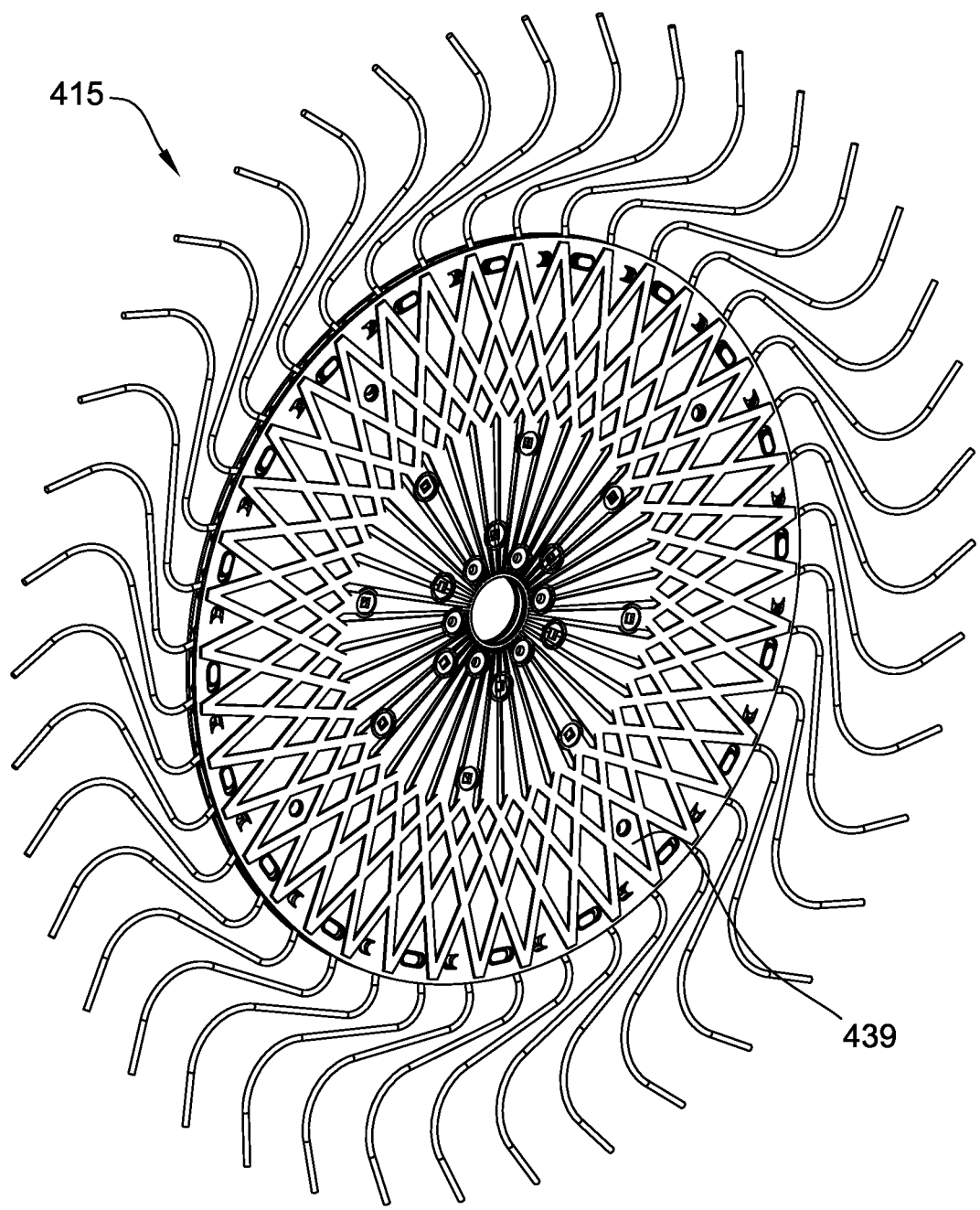
FIG. 17 is a perspective view of another embodiment of the rake wheel with the first support member being shown.
Figure 18:
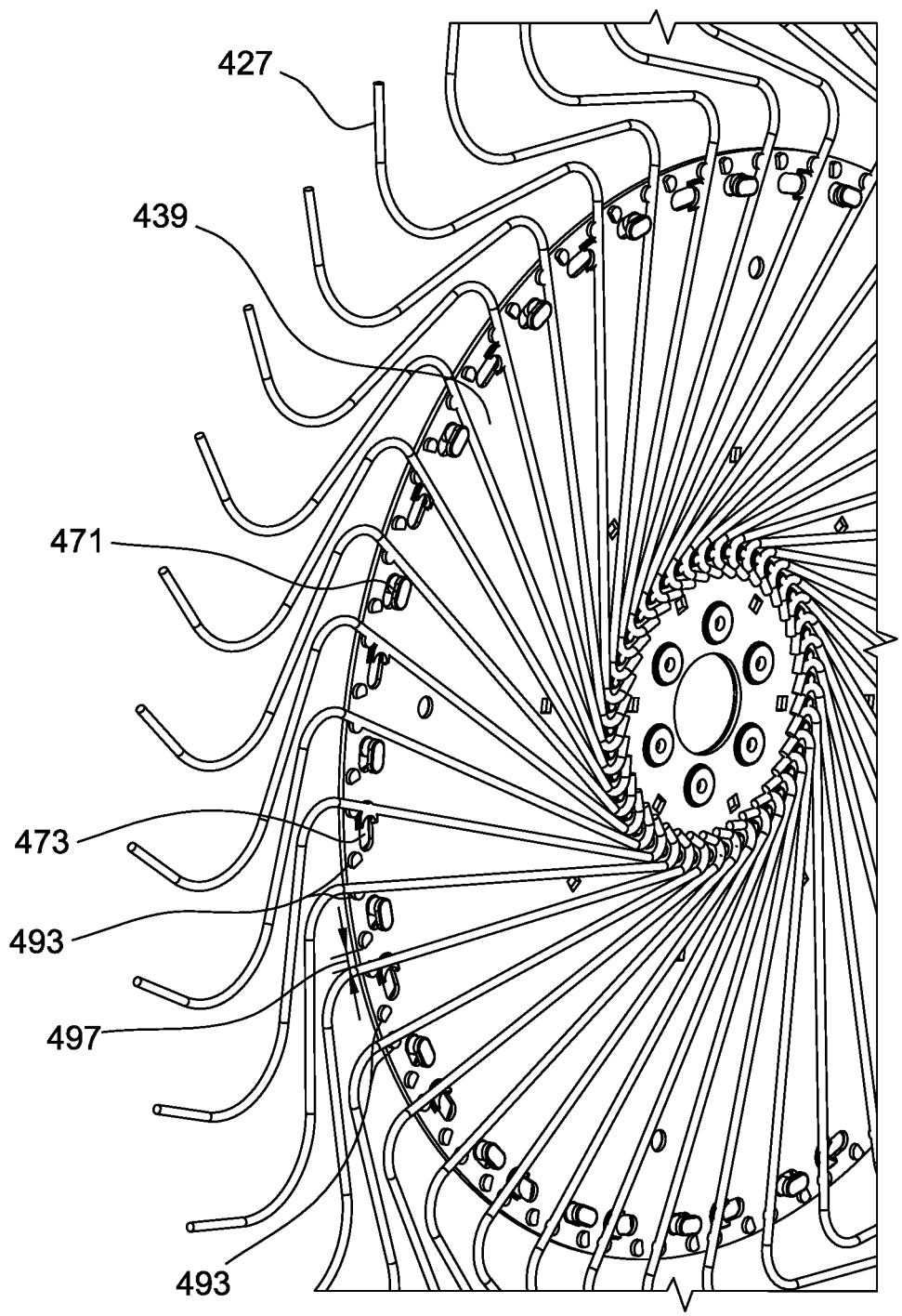
FIG. 18 is a detailed partial perspective view of the rake wheel of FIG. 17 with the second support member not being shown.
Figure 19:
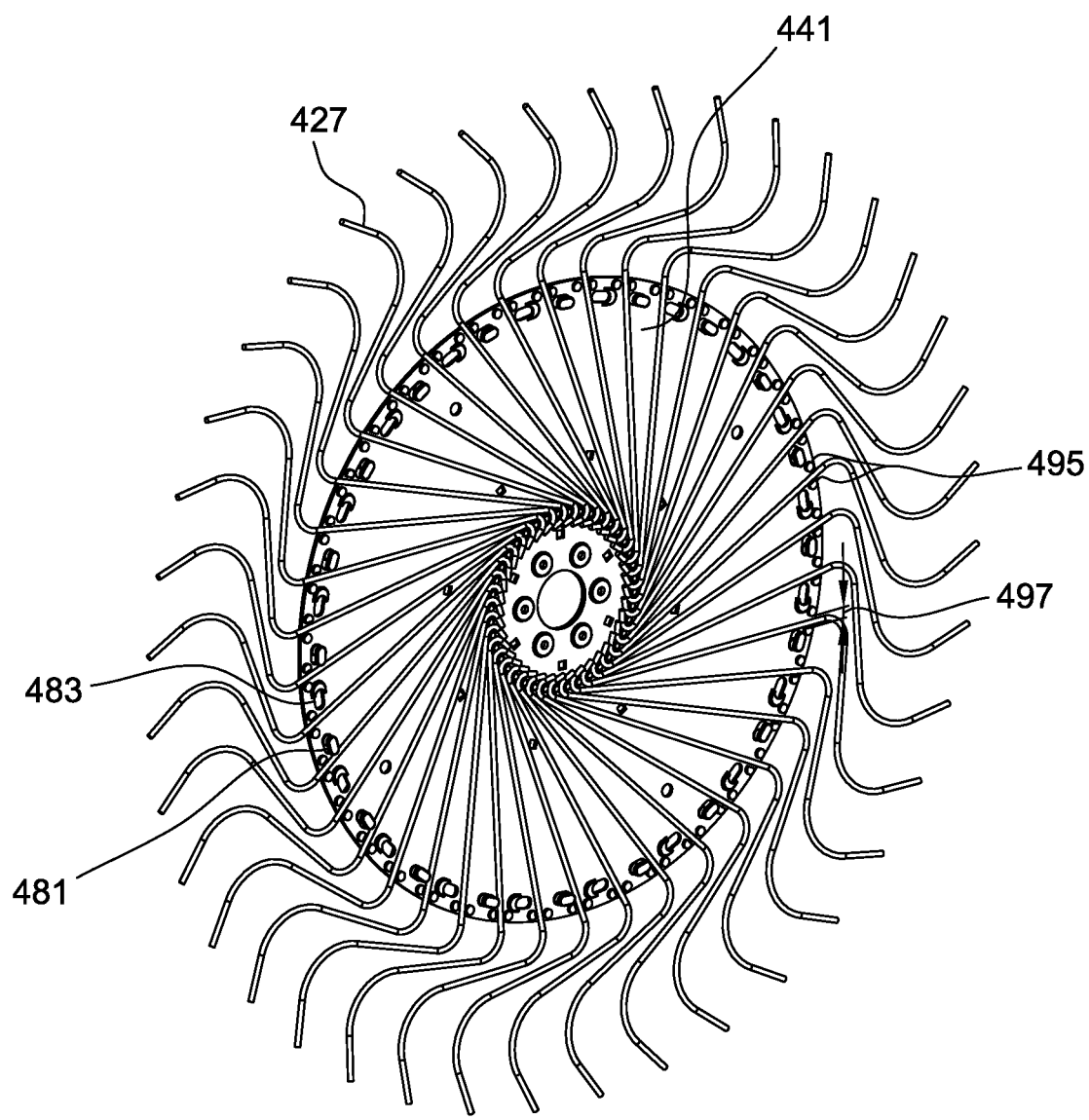
FIG. 19 is a side view of the rake wheel of FIG. 17 with the first support member not being shown.

Another embodiment of the rake wheel is shown in FIGS. 17-19. The components shown in FIGS. 17-19 that are analogous to those of FIGS. 11-15 are designated by the corresponding reference number of FIGS. 11-13 plus "300" (e.g., part 110 becomes 410). The rake wheel 415 includes a first support member 439 (FIG. 17) and a second support member 441 (FIG. 19) with tines 427 being clamped between the first and second support members 439, 441.

The rake wheel 415 includes first support disk pegs 471 and first support disk slots 473 that extend around the circumference of the first support member 439. The pegs 471 and slots 473 alternate around the circumference. The second support disk 441 includes second support disk pegs 481 and second support disk slots 483 (FIG. 15). The first support disk pegs 471 and second support disk slots 483 fasten together and the first support disk slots 473 and second support disk pegs 481 fasten together to clamp the tines 427. In the illustrated embodiment, the first and second support disks 439, 441 do not include grooves in which tines are received.

The first support disk 439 includes paired first support member bosses 493 (FIG. 18) that extend to paired second support member bosses 495 (FIG. 19) of the second support disk 441 near the outer circumference of the support members 439, 441. The first support member bosses 493 and second support member bosses 495 are radially outward of the pegs 471, 481 and slots 473, 483.

Each pair of first disk bosses 493 and pair of second disk bosses 495 opposite the first disk pair 493 form a channel through which a tine 427 extends. In this manner, the pairs 453, 495 of bosses restrict the circumferential movement of the tines 427. In various embodiments, the pair of bosses may be separated by about the diameter of the tine or no more than about 1.1 times the diameter of the tine or no more than about 1.25, 1.5, 1.75 or no more about 2 times the diameter of the tines.

Compared to conventional rake wheels, the rake wheels of embodiments of the present disclosure have several advantages. By using a support member to secure and at least partially limit circumferential movement of the tines, the tines wear less compared to conventional apparatus that use a support band having apertures through which the tines extend. Partially limiting the circumferential movement of the tines allows the rake wheel to be relatively rigid for raking operations but allows the tines to moves slightly or in small amounts relative to the support member, which dampens the stress applied to the tine and reduces tine wear. In embodiments in which the support members are made of polymer material, noise produced by the rake is reduced compared to conventional rakes with support bands.

Flexibility between the support member(s) (e.g., annular disks) and tines allows the tines to deflect laterally while raking which causes more tines to contact the ground. Additional tines contacting the ground reduces the contact force applied through each tine and spreads the weight of the wheel out over the tines. Reduced contact force lessens soil disturbance and reduces the ash and dirt content in the baled forage, thereby improving the forage content (i.e., depending on the use of the baled material, improved animal health or improved biofuel production). The flexibility between the support member(s) and tines allows the tines to move around obstacles (e.g., rocks) thereby preventing the obstacles from being swept into the windrow, thereby reducing baler damage and increasing the quality of the forage. Flexibility between the support member and tines also allows more tines to contact the crop causing more crop to be moved into the windrow for baling leaving less remnant crop in the field.

In embodiments in which the tines are clamped between two support members, the use of at least one tine fastener for every two tines creates a clamping force sufficient to at least partially limit circumferential movement of the tines. In embodiments in which the rake wheel includes one or more tine fasteners for every tine, additional clamping force may be provided. In embodiments in which the support member(s) is disk-shaped, the support members also act as a windguard which prevents crop material from wrapping around the rake wheel during use, particularly in windy conditions.

In embodiments in which the center hub is integrated into the support disk as a single piece (e.g., a single molded plastic piece), the rake wheel includes less parts thereby simplifying manufacture and allows the rake wheel to be rebuilt more simply (e.g., without welding). The rake wheel may also be capable of being used with different tine diameters (e.g., 6.8 mm, 7.2 mm and 7.5 mm diameter tines).

In embodiments in which the support members include grooves with the tines being received in the grooves, the grooves provide a positive retention of the tines (i.e., limits the circumferential movement of the tines) but allows the tine to break-away from the groove such as if the tine encounters an obstacle during rotation. Grooves also act as a visual mark for placement of the tines during assembly to simplify assembly (e.g., to provide a guide to form the correct tine angle). In embodiments in which the tines link around pins, the pins may provide spacing to allow the support members to be clamped against the tines with optimized clamp load.

In embodiments in which the rake wheel contains paired bosses at or near the outer circumference of the first and second support members, the bosses retain the tines and limit their circumferential movement. The bosses also provide a visual indication for placement of tines during assembly of the rake wheel.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A rake wheel for gathering crop material into a windrow, the rake wheel comprising:
   a center hub having a rotational axis about which the rake wheel rotates;
   a plurality of tines that extend outward from the center hub, the tines including an outer end defining an outer circumference for engaging a surface over which the rake wheel rotates, and an inner end positioned radially opposite the outer end and secured to the center hub, the rake wheel having a midpoint midway between the rotational axis and the outer circumference;
   a disk for securing the tines, the disk having an outer surface and an inner surface, the outer and inner surfaces extending radially toward the outer circumference of the tines, the disk radially overlapping the midpoint, each tine being directly secured to the inner surface to limit circumferential movement of the tines and each tine contacting the inner surface of the disk; and
   a set of fasteners for securing the tines to the disk, the set of fasteners being disposed radially outward of the center hub.

2. The rake wheel as set forth in claim 1 wherein the set of fasteners is a first set of fasteners, the rake wheel further comprising a second set of fasteners for securing the plurality of tines in the center hub.

3. The rake wheel as set forth in claim 1 wherein the rake wheel does not include a support band that is radially spaced from the center hub and having apertures through which each tine extends.

4. The rake wheel as set forth in claim 1 wherein the center hub is separate from the disk.

5. The rake wheel as set forth in claim 1 wherein the disk is planar.

6. The rake wheel as set forth in claim 1 wherein each tine is secured within a groove formed in the disk.

7. The rake wheel as set forth in claim 1 comprising bosses that extend from the disk, each tine extending between a pair of bosses to limit movement of the tine.

8. The rake wheel as set forth in claim 1 wherein the disk comprises a polymer.

9. A rake wheel for gathering crop material into a windrow, the rake wheel comprising:
   a center hub having a rotational axis about which the rake wheel rotates;
   a plurality of tines that extend outward from the center hub, the tines including an outer end defining an outer circumference for engaging a surface over which the rake wheel rotates, and an inner end positioned radially opposite the outer end and secured to the center hub;
   a first disk having an outer surface and an inner surface, the outer and inner surfaces extending radially toward the outer circumference of the tines, the first disk extending radially to at least 50% and less than 80% of the distance between the rotational axis and the outer circumference of the tines;
   a second disk having an outer surface and an inner surface, the outer and inner surfaces extending radially toward the outer circumference of the tines, the second disk extending radially to at least 50% and less than 80% of the distance between the rotational axis and the outer circumference of the tines, the first and second disks forming the center hub; and
   a set of fasteners that extend between the first and second disks that clamp the tines between the inner surface of the first disk and the inner surface of the second disk, wherein the disks limit displacement of the tines in the axial direction relative to the rotational axis and permit the tines to move circumferentially between the disks.

10. The rake wheel as set forth in claim 9 wherein the set of fasteners are a first set of fasteners, the rake wheel further comprising a second set of fasteners that secure the plurality of tines in the center hub.

11. The rake wheel as set forth in claim 10 wherein the first set of fasteners are disposed radially outward of the second set of fasteners.

12. The rake wheel as set forth in claim 9 wherein each tine contacts the inner surface of the first and second disks.

13. The rake wheel as set forth in claim 9 wherein each fastener of the set of fasteners does not contact a tine.

14. The rake wheel as set forth in claim 9 wherein the first disk has an outer circumference and the second disk has an outer circumference, each tine being free of support radially beyond the outer circumferences of the first and second disks.

15. The rake wheel as set forth in claim 9 wherein the first disk and the second disk each extends radially to at least 50% and less than 75% of the distance between the rotational axis and the outer circumference of the tines.

16. The rake wheel as set forth in claim 9 wherein the first disk and the second disk each extends radially to at least 50% and less than 70% of the distance between the rotational axis and the outer circumference of the tines.

17. The rake wheel as set forth in claim 9 wherein the first disk and the second disk each extends radially to at least 50% and less than 65% of the distance between the rotational axis and the outer circumference of the tines.

18. A rake wheel for gathering crop material into a windrow, the rake wheel comprising:
   a disk, the disk having a center hub having a rotational axis about which the rake wheel rotates;
   a plurality of tines that extend outward from the center hub, the tines including an outer end defining an outer circumference for engaging a surface over which the rake wheel rotates, and an inner end positioned radially opposite the outer end and secured to the center hub of the disk, the rake wheel having a midpoint midway between the rotational axis and the outer circumference, the disk having an outer surface and an inner surface, the outer and inner surfaces extending radially toward the outer circumference of the tines, the disk radially overlapping the midpoint, each tine being directly secured to the inner surface to limit circumferential movement of the tines; and
   a set of fasteners for securing the tines to the disk, the set of fasteners being disposed radially outward of the center hub.

19. The rake wheel as set forth in claim 18, wherein the set of fasteners are a first set of fasteners, and the rake wheel further includes:
   a second set of fasteners that secure the plurality of tines in the center hub, wherein the first set of fasteners are disposed radially outward of the second set of fasteners.

* * * * *